(12) United States Patent
Koseoglu et al.

(10) Patent No.: US 11,066,610 B2
(45) Date of Patent: Jul. 20, 2021

(54) SYSTEMS AND PROCESSES FOR SUPPRESSING HEAVY POLYNUCLEAR AROMATIC DEPOSITION IN A HYDROCRACKING PROCESS

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/424,273

(22) Filed: May 28, 2019

(65) Prior Publication Data

US 2020/0377806 A1 Dec. 3, 2020

(51) Int. Cl.
*C10G 67/00* (2006.01)
*C10G 67/04* (2006.01)
(Continued)

(52) U.S. Cl.
CPC .......... *C10G 67/0445* (2013.01); *B01J 4/001* (2013.01); *B01J 19/245* (2013.01); *C10G 67/14* (2013.01); *C10G 75/04* (2013.01); *B01J 2219/185* (2013.01); *B01J 2219/24* (2013.01); *C10G 2300/201* (2013.01); *C10G 2300/80* (2013.01)

(58) Field of Classification Search
CPC .... C10G 67/0445; C10G 67/14; C10G 75/00; C10G 75/02; C10G 75/04; C10G 2300/201; C10G 2300/80
See application file for complete search history.

(56) References Cited

U.S. PATENT DOCUMENTS

| 4,618,412 A | 10/1986 | Hudson et al. |
| 4,698,146 A | 10/1987 | Gruia |

(Continued)

FOREIGN PATENT DOCUMENTS

| CA | 3029800 A1 | 1/2018 |
| CN | 105368482 A | 3/2016 |

(Continued)

OTHER PUBLICATIONS

Marafi, et al., Effects of Diluents in Controlling Sediment Formation During Catalytic Hydrocracking of Kuwait Vacuum Residue, Petroleum Science and Technology, vol. 23, 2005, Issue 7-8, pp. 899-908.

(Continued)

*Primary Examiner* — Prem C Singh
*Assistant Examiner* — Brandi M Doyle
(74) *Attorney, Agent, or Firm* — Bracewell LLP; Constance Gall Rhebergen

(57) ABSTRACT

The disclosure describes refinery processes and process units for suppressing the precipitation and deposition of heavy polynuclear aromatic (HPNA) compounds in a process unit of a refinery, by combining the effluent from a hydrocracking unit with an aromatic solvent stream. Certain costly HPNA treatment processes can be eliminated, downtime can be reduced, and overall distillate yield can be increased by suppressing HPNA precipitation. The aromatic bottoms—which are suitable solvents for this purpose—of an aromatic recovery complex can be used in certain embodiments to dissolve HPNAs and suppress HPNA precipitation.

10 Claims, 3 Drawing Sheets

(51) Int. Cl.
  *B01J 4/00* (2006.01)
  *B01J 19/24* (2006.01)
  *C10G 67/14* (2006.01)
  *C10G 75/04* (2006.01)

(56) References Cited

U.S. PATENT DOCUMENTS

| | | |
|---|---|---|
| 5,120,426 A | 6/1992 | Johnson et al. |
| 5,190,633 A | 3/1993 | Fetzer et al. |
| 5,232,577 A | 8/1993 | Fetzer et al. |
| 5,464,526 A | 11/1995 | Saunders |
| 10,093,873 B2 | 10/2018 | Koseoglu et al. |
| 2011/0079541 A1 | 4/2011 | Koseoglu |
| 2014/0034549 A1* | 2/2014 | Mukherjee .............. C10G 65/12 208/58 |
| 2014/0197069 A1 | 7/2014 | Mukherjee et al. |
| 2015/0122703 A1 | 5/2015 | Spencer et al. |
| 2015/0152338 A1 | 6/2015 | Respini et al. |
| 2016/0097006 A1 | 4/2016 | Macris |
| 2016/0115403 A1 | 4/2016 | Macris |
| 2017/0362516 A1 | 12/2017 | Wang et al. |
| 2018/0066197 A1* | 3/2018 | Koseoglu ............... C10G 69/00 |
| 2018/0187100 A1 | 7/2018 | Koseoglu |
| 2019/0010411 A1 | 1/2019 | Koseoglu et al. |
| 2019/0241486 A1 | 8/2019 | Koseoglu et al. |

FOREIGN PATENT DOCUMENTS

| | | |
|---|---|---|
| WO | 9520637 A2 | 8/1995 |
| WO | 2017150999 A1 | 9/2017 |

OTHER PUBLICATIONS

International Search Report and Written Opinion of PCT Application No. PCT/US2020/034923 dated Jul. 27, 2020, 14 pages.

* cited by examiner

SYSTEMS AND PROCESSES FOR SUPPRESSING HEAVY POLYNUCLEAR AROMATIC DEPOSITION IN A HYDROCRACKING PROCESS

FIELD

This disclosure relates to hydrocracking processes, and in particular to the dissolution or suppression of heavy polynuclear aromatic compound precipitation in hydrocracking processes.

BACKGROUND

Hydrocracking processes are used commercially in a large number of petroleum refineries. In general, hydrocracking processes split the compounds of the feed into lighter compounds having higher average volatility and economic value. Hydrocracking processes improve the quality of the hydrocarbon feedstock by increasing the hydrogen to carbon ratio and by removing organosulfur and organonitrogen compounds.

A typical hydrocracking feed stream contains a small amount of polynuclear aromatic (PNA) compounds; aromatic compounds which contain less than seven fused benzene rings. As the feed stream is subjected to hydrocracking at elevated temperature and pressure, heavy polynuclear aromatic (HPNA) compounds, aromatic compounds which contain seven or more fused benzene rings, tend to form and are present in high concentration in the unconverted hydrocracker bottoms.

Formation of HPNA compounds is an undesirable side reaction that occurs in hydrocrackers. Heavy polynuclear aromatic compounds have limited solubility in the effluent of a hydrocracking reactor and tend to accumulate in the recycle system. While, HPNA compounds are soluble at reaction conditions, the compounds come out of the reaction mixture and precipitate downstream when thermodynamic conditions change; thus fouling various parts of the downstream refining equipment. Ultimately, extreme deposits can require cleaning and an interruption to the refining process.

Hydrocarbon streams containing HPNA compounds are usually treated to reduce the build-up of HPNA compounds by removing them through adsorption, hydrogenation, extraction, vacuum distillation, solvent-deasphalting, and purging or "bleeding" a portion of the recycle stream from the hydrocracking system and cracking or utilizing the bleed stream elsewhere in the refinery. Each of these treatments have significant costs.

SUMMARY

Disclosed here are processes and systems that use an aromatic solvent to suppress the precipitation and deposition of HPNA compounds in certain units of a refinery—specifically in a hydrocracking unit and downstream of a hydrocracking unit. Heavy polynuclear aromatic precipitation and deposition can be suppressed downstream of a hydrocracking reactor by combining an effluent of the hydrocracker unit with an aromatic solvent stream. Certain costly HPNA treatment processes can be minimized or eliminated and downtime can be reduced by suppressing HPNA precipitation. Aromatic bottoms streams from typical aromatic recovery complexes are suitable solvents for suppressing HPNA precipitation.

Certain embodiments disclosed here include processes for suppressing HPNA compounds in a refinery. An example of one such process includes the steps of supplying a hydrocarbon feedstock and hydrogen to a hydrocracking unit having a reaction zone; hydrocracking the hydrocarbon feedstock in the reaction zone of the hydrocracking unit to produce a hydrocracked effluent; introducing an aromatic solvent that is derived from aromatic bottoms to the hydrocracked effluent to produce a HPNA-suppressed effluent; and fractionating the HPNA-suppressed effluent to produce overhead products and unconverted bottoms. Certain embodiments can further include processing the hydrocarbon feedstock in a hydrocracking unit that includes first- and second-stage reaction zones. In embodiments first- and second-stage reaction zones, the hydrocarbon feedstock is hydrocracked in the first-stage reaction zone to produce a first-stage effluent which is hydrocracked in the second-stage reaction zone to produce the hydrocracked effluent. The introduction of the aromatic solvent to the hydrocracked effluent suppresses the precipitation of HPNA compounds in downstream processes. The aromatic solvent can contain heavy alkyl aromatic compounds and multi-ring aromatic compounds. In certain embodiments, the aromatic solvent can comprise a heavy fraction of aromatic bottoms that consists of compounds having an initial boiling point above about 180° C. In certain embodiments, the aromatic solvent can have a Hildebrand solubility parameter of at least about 18 $MPa^{1/2}$.

Another example of such an embodiment includes the steps of supplying a hydrocarbon feedstock and hydrogen to a hydrocracking unit; hydrocracking the hydrocarbon feedstock to produce a first-stage effluent; fractionating the first-stage effluent to produce overhead products and unconverted bottoms; hydrocracking the unconverted bottoms to produce a second-stage effluent; combining the second-stage effluent with an aromatic solvent to produce a HPNA-suppressed effluent; and fractionating the HPNA-suppressed effluent. Certain embodiments further include the step of hydrocracking a portion of the unconverted bottoms with the hydrocarbon feedstock to produce the first-stage effluent. The aromatic solvent can be derived from an aromatic bottoms. The introduction of the aromatic solvent suppresses the precipitation of HPNA compounds in downstream processes. In certain embodiments, the aromatic solvent contains heavy alkyl aromatic compounds and multi-ring aromatic compounds. In certain embodiments, the aromatic solvent comprises a fraction of aromatic bottoms that consists of compounds having an initial boiling point above about 180° C. In certain embodiments, the aromatic solvent has a Hildebrand solubility parameter of at least about 18 $MPa^{1/2}$.

Certain embodiments include process units for suppressing the precipitation of HPNA compounds in a refinery. An example of one such embodiment includes a hydrocarbon feedstock inlet stream and a hydrogen inlet stream that introduce hydrocarbons and hydrogen respectively to a hydrocracking unit. The hydrocarbons are hydrocracked in the hydrocracking unit, producing a hydrocracking-unit effluent stream. In certain embodiments, the hydrocracking unit includes first- and second-stage reaction zones; the hydrocarbon feedstock being hydrocracked in the first-stage reaction zone to produce a first-stage effluent, and the first-stage effluent being hydrocracked in the second-stage reaction zone to produce the hydrocracking-unit effluent. An aromatic solvent stream introduces an aromatic solvent to the hydrocracking-unit effluent stream to produce a HPNA-suppressed effluent stream. The HPNA-suppressed effluent stream introduces HPNA-suppressed effluent to a fractionator, where the HPNA-suppressed effluent is fractionated.

The aromatic solvent can include straight-run or fractionated aromatic bottoms from an aromatic recovery complex. The aromatic solvent can include heavy alkyl aromatic compounds and multi-ring aromatic compounds. In certain embodiments, the aromatic solvent includes a fraction of aromatic bottoms that consists of compounds having an initial boiling point above about 180° C. In certain embodiments, the aromatic solvent has a Hildebrand solubility parameter of at least about 18 $MPa^{1/2}$.

Another example of a process unit for suppressing precipitation of HPNAs in a refinery includes a hydrocarbon feedstock inlet stream and a hydrogen inlet stream that introduce hydrocarbons and hydrogen respectively to a first-stage hydrocracking unit. The hydrocarbon feedstock is hydrocracked in the first-stage hydrocracking unit to produce a first-stage effluent. A fractionator having a fractionator inlet stream comprising the first-stage effluent fractionates the first-stage effluent to obtain unconverted bottoms. The unconverted bottoms are then sent to a second-stage hydrocracking unit, and are introduced to the second-stage hydrocracking unit by a second-stage hydrocracking unit inlet stream. The unconverted bottoms are hydrocracked in the second-stage hydrocracking unit to produce second-stage effluent. The second-stage effluent leaves the second-stage hydrocracking unit in a second-stage effluent stream. An aromatic solvent stream introduces an aromatic solvent to the second-stage effluent stream to produce an HPNA-suppressed effluent stream that includes HPNA-suppressed effluent. The HPNA-suppressed effluent is introduced to the fractionator by the fractionator inlet stream where the HPNA-suppressed effluent is fractionated. Certain embodiments also include an unconverted bottoms recycle stream that recycles unconverted bottoms from the fractionator to the first-stage hydrocracking unit. The aromatic solvent can include heavy alkyl aromatic compounds and multi-ring aromatic compounds. In certain embodiments, the aromatic solvent can include a fraction of aromatic bottoms that consists of compounds having an initial boiling point above about 180° C. In certain embodiments, the aromatic solvent can have a Hildebrand solubility parameter above about 18 $MPa^{1/2}$.

BRIEF DESCRIPTION OF THE DRAWINGS

The embodiments disclosed here will be readily understood by the following detailed description along with the accompanying drawings. The embodiments in the drawings are illustrated by way of example and not by way of limitation.

DETAILED DESCRIPTION

Figure 1:
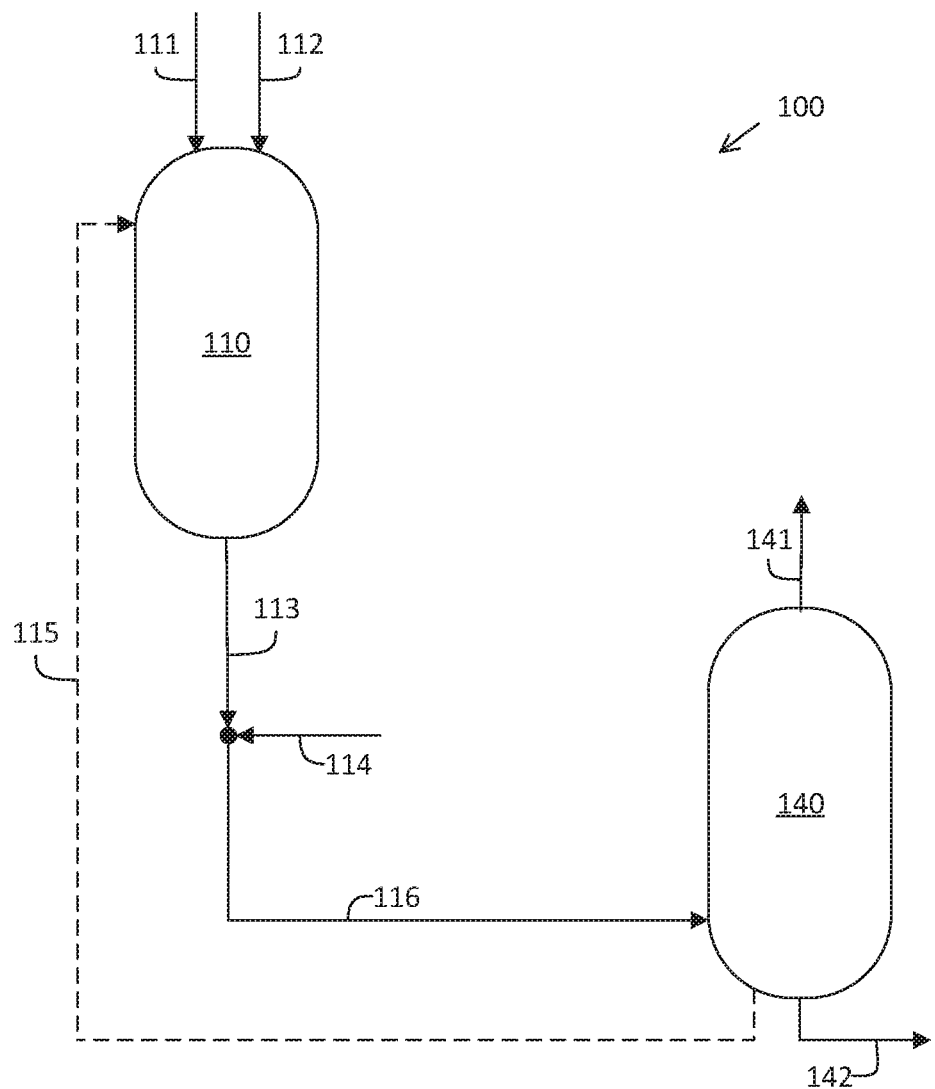
FIG. 1 is a schematic diagram of a single-stage hydrocracking process unit.

This disclosure describes various embodiments related to processes, units, and systems for reducing or suppressing HPNA precipitation or deposition in a hydrocracking process unit or downstream of a hydrocracking unit.

For certain embodiments, many details are provided for thorough understanding of the various components or steps. In other instances, well-known processes, devices, and systems are not described in particular detail so that the embodiments are not obscured by details. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description is not to be taken in a limiting sense.

The description can use the phrases "in some embodiments," "in various embodiments," "in an embodiment," or "in embodiments," which can each refer to one or more of the same or different embodiments. Furthermore, the terms "comprising," "including," "having," and the like, as used with respect to embodiments of the present disclosure, are synonymous.

Ranges can be expressed in this disclosure as from about one particular value and to about another particular value. When such a range is expressed, it is to be understood that another embodiment is from the one particular value and/or to the other particular value, along with all combinations within said range. When the range of values is described or referenced in this disclosure, the interval encompasses each intervening value between the upper limit and the lower limit as well as the upper limit and the lower limit and includes smaller ranges of the interval subject to any specific exclusion provided.

Where a method comprising two or more defined steps is recited or referenced herein, the defined steps can be carried out in any order or simultaneously except where the context excludes that possibility.

The various embodiments have been described in detail for the purpose of illustration, but they are not to be construed as limiting. Instead, this disclosure is intended to disclose certain embodiments with the understanding that many other undisclosed changes and modifications can fall within the spirit and scope of the disclosure.

As used in this disclosure, the term "heavy polynuclear aromatic compounds" (HPNAs) refers to highly condensed aromatic compounds with seven or more aromatic rings, such as coronenes having seven aromatic rings and ovalenes having ten aromatic rings.

As used in this disclosure, the term "hydrocracking" refers to those catalytic processes that involve the hydrogenation and hydrocracking of hydrocarbons to produce compounds with a lower molecular weight. It generally includes combining chemicals derived from hydrocarbons with hydrogen at high temperature and pressure and allowing the mixture to react in the presence of a catalyst.

As used in this disclosure, the terms "hydrocracker" and "hydrocracking reactor" are synonymous and refer to a reactor designed to carry out the catalytic processes that involve the hydrogenation of hydrocarbons with long-chain hydrocarbons to produce fractions with a lower molecular weight. A hydrocracker has at least one zone designed to carry out hydrocracking.

As used in this disclosure, the term "zone" refers to an area including one or more equipment, or one or more subzones. Equipment can include one or more reactors or reactor vessels, heaters, heat exchangers, pipes, pumps, compressors, and controllers. Additionally, an equipment, such as reactor, dryer, or vessels, further can include one or more zones.

As used in this disclosure, the term "hydrocracking feedstock" refers to hydrocarbons that are delivered to a hydrocracking unit for the purpose of converting at least a portion of the hydrocarbons into a lower-molecular-weight fraction. An example of a typical hydrocracking feedstock is vacuum gas oil boiling nominally in the range of about 300-565° C., preferably in the range of about 350-565° C., most preferably in the range of about 370-565° C. Demetalized oil or deasphalted oil, or both, are sometimes blended with vacuum gas oil to produce a hydrocracking feedstock. Examples of hydrocracking feedstock include demetalized oil, deasphalted oil, vacuum gas oil, heavy coker gas oil, heavy vacuum gas oil, light cycle oil, and atmospheric gas oil. A hydrocracking feedstock can have a boiling point as high as 800° C.

As used in this disclosure, the term "hydrocracking unit" refers to the major process equipment and machinery, or discrete plant unit, designed to carry out the function of hydrocracking in a refinery. A hydrocracking unit has at least one hydrocracker.

As used in this disclosure, the terms "aromatic recovery complex" and "aromatic complex" are used synonymously and refer to the combination of process units that convert hydrocarbons into the aromatic intermediates: benzene, toluene, and xylenes. Aromatic recovery complexes can have many different configurations, and can include different process units. An aromatic recovery complex can include a naphtha hydrotreating unit for the removal of sulfur and nitrogen contaminants, and a catalytic reforming unit for the production of aromatics from naphtha, and typically has an aromatics separation unit for the separation of aromatic compounds such as benzene, toluene, and xylene. An aromatic recovery complex can also include process units for the conversion of toluene and heavy aromatics to xylenes and benzene, and can include process units for producing one or more xylene isomers.

As used in this disclosure, the term "aromatic bottoms" refers to the effluent from an aromatic recovery complex after the product aromatics are separated. Aromatic bottoms can include the heavy fraction from a p-xylene adsorption unit. Aromatic bottoms typically consist of $C_{9+}$ compounds. Aromatic bottoms can include monoaromatic compounds with at least one alkyl group and multi-ring aromatic compounds. The multi-ring aromatic compounds can include condensed multi-ring aromatic compounds and alkyl-bridged noncondensed alkyl aromatic compounds.

As used in this disclosure, the term "rich" means an amount of at least 50% or greater, by mole percentage of a compound or class of compounds. Certain streams rich in a compound or class of compounds can contain about 70% or greater, by mole percentage of the particular compound or class of compounds in the streams. In certain cases, mole percentage can be replaced by weight percentage, in accordance with standard industry usage.

As used in this disclosure, the term "substantially" means an amount of at least 80%, by mole percentage of a compound or class of compounds. Certain streams substantially containing a compound or class of compounds can contain at least 90%, by mole percentage of the compound or class of compounds in the streams. Certain streams substantially containing a compound or class of compounds can contain at least 99%, by mole percentage of the compound or class of compounds in the streams. In certain cases, mole percentage can be replaced by weight percentage, in accordance with standard industry usage.

In this disclosure, the term "precipitation" is intended to embody the process by which HPNA compounds come out of a hydrocarbon solution. Whether by precipitation or flocculation, the term "precipitation" is intended to embody both processes.

The precipitation of HPNA compounds in a hydrocarbon solution can be suppressed by combining a hydrocarbon solution containing HPNA compounds with an aromatic solvent. The concentration of HPNAs in a hydrocracking process is usually maintained below the precipitation limit. The addition of an aromatic solvent allows the hydrocracking process to be operated with a higher concentration of HPNAs by increasing the precipitation limit. Processes for removing HPNA compounds can be avoided or minimized by suppressing the precipitation of HPNAs.

The aromatic solvent can be any process stream that is rich in aromatics, and that contains heavy alkyl aromatic compounds and multi-ring aromatic compounds. Aromatic solvents substantially composed of aromatic bottoms from an aromatic recovery complex are suitable solvents of HPNA compounds. Preferably, the aromatic solvent has a Hildebrand solubility parameter that is at least about 18.0 $MPa^{1/2}$. In some embodiments, the aromatic solvent has a Hildebrand solubility parameter that is in the range of about 18.0-22.0 $MPa^{1/2}$. The aromatic solvent can be derived from aromatic bottoms from an aromatic recovery complex. The process of deriving the aromatic solvent from aromatic bottoms includes processing reformate from a catalytic reforming unit to obtain aromatic bottoms comprising heavy alkyl aromatic compounds and multi-ring aromatic compounds; and producing the aromatic solvent comprising either straight-run aromatic bottoms or processed aromatic bottoms. In some embodiments, the aromatic bottoms can be fractionated to obtain the heavy fraction. Preferably, the aromatic solvent is a fraction of aromatic bottoms from an aromatic recovery complex that boils at a temperature above 180° C. The aromatic solvent can be a $C_{11+}$ fraction of an aromatic bottoms from an aromatic recovery complex. In some embodiments, the aromatic solvent is introduced in an amount that is at least ten times the concentration of HPNAs in the hydrocracking-unit effluent, preferably at least one thousand times the concentration of HPNAs in the hydrocracking-unit effluent.

In an aromatic recovery process, a reformate from a catalytic reforming unit is processed to recover high value aromatics such as benzene, toluene, and xylenes. In the process, the reformate from the catalytic reforming unit is split into two fractions: light and heavy reformate. The light reformate is sent to a benzene extraction unit to extract benzene. The heavy reformate is sent to a p-xylene separation unit to recover p-xylene. Other xylenes are recovered in a mixed xylene stream and sent to a xylene isomerization unit to produce p-xylene. The p-xylene produced in the xylene isomerization unit is recycled to the p-xylene adsorption unit where p-xylene is separated and the portion that cannot be recovered as p-xylene or other products is recovered as process reject or bottoms.

As olefins are detrimental in the extraction and adsorption processes that take place within an aromatic recovery complex, olefinic hydrocarbons are usually removed in a clay tower or by selective hydrogenation. The oligomer byproducts formed by a reaction of olefinic hydrocarbons in the presence of an acid catalyst are heavy aromatics and are removed by fractionation. The $C_{8+}$ fraction of reformate substantially contains aromatics (more than 95%). The olefinic species in this reformate are composed primarily of alkenyl aromatics, such as styrene and methyl-styrene. Such compounds would be expected to react in the presence of Lewis-acid sites in the clay at temperatures around 200° C. with the aromatics via a Friedel-Crafts reaction to form compounds with two aromatic rings connected with an alkyl bridge. Alkenyl aromatics react with these compounds to form multi-ring aromatic compounds with two or more aromatic rings connected by alkyl bridges. Such multi-ring aromatic compounds are characterized as having a relatively high density (greater than 900 kg/m³), a darker brown color (Standard Reference Method Color greater than 20), and higher boiling points (greater than 280° C.), as compared to nonbridged alkyl aromatics. These compounds are removed from the aromatic recovery process as part of aromatic bottoms.

By way of example and not limitation, multi-ring aromatic compounds found in aromatic bottoms include various alkyl-bridged noncondensed alkyl aromatic compounds as shown in Formula I, Formula II, and Formula III, and various combinations of these compounds.

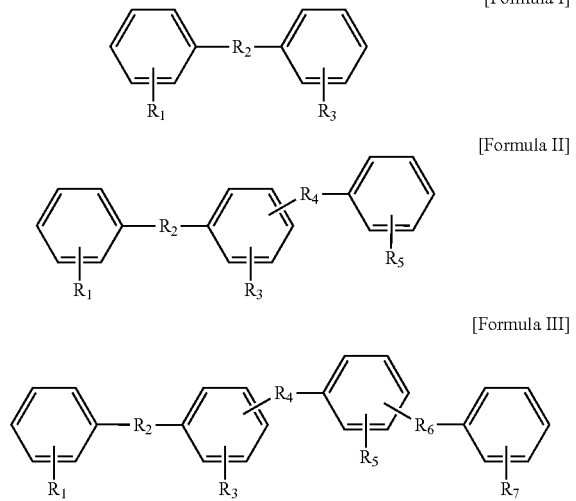

[Formula I]

[Formula II]

[Formula III]

$R_2$, $R_4$, and $R_6$ are alkyl bridge groups independently having from two to six carbon atoms. $R_1$, $R_3$, $R_5$, and $R_7$ are independently selected from the group consisting of hydrogen and an alkyl group having from one to eight carbon atoms. In addition to the groups $R_1$, $R_3$, $R_5$, and $R_7$, the benzene groups of Formulas I, II, and III can further include additional alkyl groups connected to the benzene groups, respectively. In addition to the four benzene groups of Formula III, the various alkyl-bridged noncondensed alkyl aromatic compounds can include five or more benzene groups connected by alkyl bridges, where the additional benzene groups further can include alkyl groups connected to the additional benzene groups. In addition to alkyl-bridged noncondensed alkyl aromatics, condensed aromatics such as naphthalenes can also form from large chain alkyl aromatics such as n-butyl-benzene by cyclization and dehydrogenation over acidic catalysts in an aromatic recovery complex.

In addition to alkyl-bridged noncondensed multi-ring aromatic compounds, condensed multi-ring aromatic compounds such as anthracenes can form from large chain alkyl aromatics such as n-butyl-anthracene by cyclization and dehydrogenation over acidic catalysts. These multi-ring condensed aromatic compounds are removed from the aromatic recovery process as aromatic bottoms. By way of example and not intending to be limiting, examples of multi-ring condensed aromatic compounds are shown in Formula IV, Formula V, Formula VI, and Formula VII.

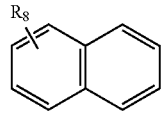

[Formula IV]

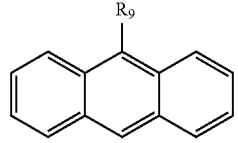

[Formula V]

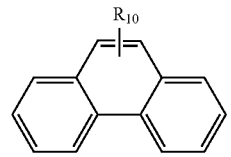

[Formula VI]

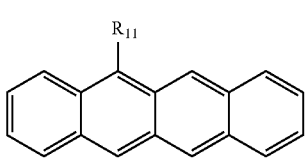

[Formula VII]

Formula IV, Formula V, Formula VI, and Formula VII show condensed multi-ring aromatics. The fused rings in the formulas are characteristic of condensed multi-ring aromatics. $R_8$, $R_9$, $R_{10}$, and $R_{11}$ are independently selected from the group consisting of hydrogen and an alkyl group having from one to eight carbon atoms. The positions of $R_8$, $R_9$, $R_{10}$ and $R_{11}$ are exemplary only, and additional alkyl groups can bond to benzene groups in Formula IV, Formula V, Formula VI, and Formula VII in other locations. In some embodiments, the aromatic solvent comprises the compounds shown in Formulas IV-VII and variations of these compounds.

The nonaromatic olefin portion of the $C_{8+}$ fraction of reformate from a catalytic reforming unit would be expected to react across Lewis acid sites in a clay tower, at temperatures around 200° C., with alkyl aromatics via a Friedel-Crafts reaction to form diaromatic compounds with at least one alkyl group. Such heavy diaromatics can be characterized as having a moderately high density (greater than 900 kg/m³), and higher boiling points (greater than 280° C.), as compared to lighter alkyl aromatics. Such heavy compounds are separated from $C_9$ and $C_{10}$ monoaromatics by fractionation before the $C_9$ and $C_{10}$ aromatics are sent to the toluene disproportionation and transalkylation process unit for conversion to benzene and xylenes.

Processing of a stream containing multi-ring aromatic compounds can include separation from lighter unreacted alkyl aromatics by fractionation, where a separation process can provide at least one low-boiling point (or light) fraction containing reduced levels of olefins and at least one high-boiling point (or heavy) fraction containing the multi-ring aromatic compounds along with high boiling point alkyl aromatics. The heavy fraction containing the multi-ring aromatic compounds is a low quality stream that is typically used as a gasoline blending component because it has a relatively high octane; however, constraints on density, color, and boiling point can limit the amount that can be blended into a gasoline. Alternatively, the heavy fraction containing the multi-ring aromatic compounds can be utilized as a fuel oil blend component. The heavy fraction containing the multi-ring aromatics typically is not processed in catalytic units such as a toluene/$C_9$/$C_{10}$ transalkylation unit, because the condensed multi-ring aromatics in the heaviest fractions with greater than ten carbon atoms tend to form catalyst-deactivating coke layers at the conditions used in such units. The formation of coke layers potentially limits catalyst life between regenerations. Accordingly, alternative processing methods and systems are needed to optimize the use of a hydrocarbon process stream containing alkyl-bridged noncondensed alkyl aromatic compounds.

The HSB parameter provides a numerical estimate of the degree of solubility between materials. The HSB parameter is derived from the cohesive energy density of the solvent, and can be expressed in units of $MPa^{1/2}$. HSB parameters for various solvents are tabulated in Table 1.

TABLE 1

Hildebrand Solubility Parameters of Solvents

| Solvent | δ ($MPa^{1/2}$) |
|---|---|
| Heptane* | 15.3 |
| n-Dodecane* | 16.0 |
| Benzene* | 18.7 |
| Kerosene | 16.3 |
| Light gas oil | 15.7 |
| Aromatic Bottoms (full range) | 20.7 |
| Aromatic Bottoms (boiling above 180° C.) | 21.2 |

*Joel H. Hildebrand, Journal of Paint Technology, Vol. 39, No. 505, February 1967.

As shown in Table 1, heptane, a paraffinic solvent with a carbon number of seven, has HSB of 15.3 $MPa^{1/2}$; and n-dodecane, a paraffinic solvent with carbon number of twelve, has HSB of 16 $MPa^{1/2}$. The HSB for benzene, a monoaromatic solvent with a carbon number of six, is 18.7 $MPa^{1/2}$. Kerosene, which is composed of both aromatic and paraffinic compounds, has a HSB of 16.3 $MPa^{1/2}$. Light gas oil seems to be more paraffinic in nature based on the HSB compared with the kerosene fraction. Both the full-range aromatic bottoms and the fraction having an initial boiling point above 180° C. have high HSB parameters (i.e., HSB parameter above about 18.0 $MPa^{1/2}$) of 20.7 $MPa^{1/2}$ and 21.2 $MPa^{1/2}$ respectively, that are suitable for suppressing HPNA formation. Notably, the aromatic solvents here have HSB parameters higher than benzene. Other fractions of aromatic bottoms would be expected to have HSB parameters suitable to suppress HPNA formation. Also, mixtures substantially composed of aromatic bottoms would be expected to have high HSB parameters. Solvents composed, at least in part, of aromatic bottoms and having a HSB parameter of at least about 18.0 $MPa^{1/2}$ can be used to suppress HPNA formation. In some embodiments, the aromatic solvent has a HSB parameter of at least about 20.0 $MPa^{1/2}$. In some embodiments, the aromatic solvent has a HSB parameter in the range of about 20.0-22.0 $MPa^{1/2}$.

FIG. 1 is a schematic illustration of an example process unit 100 for suppressing the precipitation of HPNAs. The process unit 100 has a hydrocracking unit 110 and a fractionator 140. A hydrocracker feedstock stream 111 comprising a hydrocarbon feedstock and a hydrogen stream 112 comprising hydrogen are supplied to the hydrocracking unit 110, and can be combined before being introduced to the hydrocracking unit 110. The hydrocracking unit 110 is in fluid communication with the fractionator 140 by a hydrocracking-unit effluent stream 113 in series with a HPNA-suppressed effluent stream 116 (i.e., the hydrocracking-unit effluent stream 113 precedes the HPNA-suppressed effluent stream 116).

An aromatic solvent can be introduced at one or more points downstream of the hydrocracking unit 110. The aromatic solvent is introduced to the hydrocracking-unit effluent stream 113 by an aromatic solvent stream 114 comprising the aromatic solvent. Because HPNA compounds tend to deposit when they are cooled, it is preferable to introduce the aromatic solvent to the effluent from the hydrocracking unit 110 before it is cooled. In some embodiments, the aromatic solvent is introduced to the hydrocracking-unit effluent stream 113 before any feed-effluent heat exchangers. In some embodiments, the aromatic solvent is introduced to the hydrocracking-unit effluent stream 113 before a trim cooler. In some embodiments, the aromatic solvent is introduced to the hydrocracking-unit effluent stream 113 before it is cooled in an air cooler. In some embodiments, the aromatic solvent is introduced to the hydrocracking-unit effluent stream 113 before a high-pressure-high-temperature separator. A HPNA-suppressed effluent is produced from the combination of the hydrocracking-unit effluent in hydrocracking-unit effluent stream 113 with the aromatic solvent from aromatic solvent stream 114. After aromatic solvent stream 114 introduces the aromatic solvent to the hydrocracking-unit effluent stream 113, HPNA-suppressed effluent stream 116 delivers the HPNA-suppressed effluent to the fractionator 140.

The HPNA-suppressed effluent from HPNA-suppressed effluent stream 116 is separated into unconverted bottoms and overhead products in fractionator 140. The overhead products are removed from the fractionator 140 in overhead product streams 141, and the unconverted bottoms are removed from the fractionator 140 in unconverted bottoms stream 142. The overhead product in overhead product streams 141 can include diesel, jet fuel, naphtha, distillates, and lubricating oils. A portion of the unconverted bottoms can be recycled to the hydrocracking unit 110 by a recycle stream 115. The recycle stream 115 can be introduced directly to the hydrocracking unit 110, or it can be combined with the hydrocracker feedstock stream 111 before being introduced to the hydrocracking unit 110.

In certain embodiments, a process for suppressing HPNA precipitation in a process unit like the process unit of FIG. 1 comprises the steps of: supplying a hydrocracking feedstock and hydrogen; reacting the hydrocracking feedstock with hydrogen in the presence of a catalyst in a hydrocracking unit to produce a hydrocracked effluent; supplying an aromatic solvent and introducing it to the hydrocracked effluent to suppress HPNA precipitation and produce a HPNA-suppressed effluent; separating the HPNA-suppressed effluent into unconverted bottoms and overhead products; and optionally recycling at least a portion of the unconverted bottoms to the hydrocracking unit to react with the hydrocracking feedstock and hydrogen.

The step of providing a hydrocarbon feedstock includes introducing a feedstock such as vacuum gas oils boiling in the range of about 370-565° C. for conventional hydrocracking reactors, or feeds boiling above about 565° C. for residue hydrocracking units. Demetalized oil or deasphalted oil can be blended with vacuum gas oil for hydrocracking or used alone. By way of example and not limitation, a hydrocarbon feedstock can be a blend composed of about 75-90% vacuum gas oils and about 10-25% demetalized oil or deasphalted oil. For difficult operations, the hydrocarbon feedstock can be 100% demetalized oil or deasphalted oil. However, heavy feedstocks such as demetalized oil or deasphalted oil have much higher concentrations of nitrogen, sulfur, and poly nuclear aromatic compounds (i.e. compounds having less than seven fused aromatic rings) than vacuum gas oil feedstock. These impurities can lower the efficiency of the hydrocracking unit and require the hydrocracking process to be carried out with a higher operating temperature, higher partial pressure of hydrogen, or additional catalyst volume. High concentrations of impurities can also accelerate catalyst deactivation. The feedstock can be mixed with hydrogen prior to being introduced to the hydrocracking unit, or the feedstock and hydrogen can be introduced to the hydrocracking unit independently.

The step of reacting the feedstock and hydrogen in the presence of a catalyst in the hydrocracking unit to produce a hydrocracking unit effluent includes hydrotreating and hydrocracking the feedstock in a single stage, typically under severe operating conditions. The reactor in the hydrocracking unit is operated at a temperature in the range of about 300° C. to about 500° C.; a pressure in the range of about 50 bar to about 200 bar; a hydrogen feed rate up to about 2500 standard liters per liter of hydrocarbon feed; and a liquid hourly space velocity in the range of about 0.25 to about 3.0 per hour.

In the step of supplying an aromatic solvent and introducing it to the hydrocracked effluent to suppress HPNA precipitation and produce a HPNA-suppressed effluent, the aromatic solvent can be an aromatic-rich hydrocarbon solution at least partially composed of heavy alkyl aromatic compounds and multi-ring aromatic compounds. Preferably, the aromatic solvent has a HSB parameter above about 18.0 $MPa^{1/2}$. In some embodiments, the aromatic solvent has a HSB parameter of at least about 20.0 $MPa^{1/2}$ In some embodiments, the aromatic solvent has a HSB parameter in the range of about 20.0-22.0 $MPa^{1/2}$. In some embodiments, the aromatic solvent comprises straight-run aromatic bottoms from an aromatic recovery complex. In some embodiments, the aromatic solvent comprises full-range straight-run aromatic bottoms from an aromatic recovery complex. In some embodiments, the aromatic solvent is a fraction of aromatic bottoms from an aromatic recovery complex boiling above 180° C. In some embodiments, the aromatic solvent is the $C_{9+}$ fraction of the aromatic bottoms from an aromatic recovery complex. In some embodiments, the aromatic solvent is the $C_{11+}$ fraction of the aromatic bottoms from an aromatic recovery complex. An example of an aromatic solvent is the full-range aromatic bottoms or heavy aromatic bottoms fraction (e.g., the fraction boiling above 180° C.) disclosed in Table 1, and the aromatic solvents discussed in Examples 1-3 below. The addition of the aromatic solvent suppresses HPNA precipitation in downstream processes; improving process efficiency, minimizing or eliminating the need to treat the stream for the removal of HPNAs, and increasing overall distillate yield.

In the step of separating the HPNA-suppressed effluent into unconverted bottoms and overhead products, separation of the HPNA-suppressed effluent can be achieved by fractionation in a fractionator. Product streams can include diesel, jet fuel, naphtha, distillates, and lubricating oils. To avoid the accumulation of suppressed HPNA compounds in the system, suppressed HPNA compounds should be bled from the system. In some embodiments, suppressed HPNA compounds are removed from the system with unconverted bottoms.

In the step of optionally recycling at least a portion of the unconverted bottoms to the hydrocracking unit to react with the hydrocracking feedstock and hydrogen, the recycled unconverted bottoms can be introduced to the hydrocracking unit independently or combined with the feedstock and hydrogen before being introduced.

An example of a single-stage hydrocracking process for suppressing HPNA precipitation in a process unit like the process unit of FIG. 1 is provided here. This process can be used for mild hydrocracking. A hydrocracking feedstock and hydrogen are fed to the hydrocracking unit. The hydrocracking feedstock and hydrogen can be combined before they are introduced to the hydrocracking unit and can be preheated. The hydrocracking feedstock is hydrotreated or hydrotreated and hydrocracked in a single stage, typically under severe operating conditions.

The reactor in the hydrocracking unit is operated at a temperature in the range of about 300-500° C.; a pressure in the range of about 50 bar to about 200 bar; a hydrogen feed rate up to about 2500 standard liters per liter of hydrocarbon feed; and a liquid hourly space velocity in the range of about 0.25-3.0 per hour. The hydrocracking unit produces a hydrocracking-unit effluent.

An aromatic solvent is introduced to the hydrocracking-unit effluent between the hydrocracking unit and fractionator to produce a HPNA-suppressed effluent. In some embodiments, the aromatic solvent is injected directly into the hydrocracking-unit effluent stream. The aromatic solvent dissolves HPNAs present in the hydrocracking unit effluent and suppresses HPNA precipitation in downstream processes; improving process efficiency, minimizing or eliminating the need to treat the stream for the removal of HPNAs, and increasing overall distillate yield.

The HPNA-suppressed effluent is separated in a fractionator to produce overhead product streams such as naphtha and diesel boiling in the temperature range of about 360-370° C., and unconverted bottoms boiling above about 370° C. A portion of the unconverted bottoms can be removed from the fractionator as a bleed stream. The recycle stream can be drawn directly from the fractionator, or can be drawn from the unconverted bottoms stream.

Figure 2:
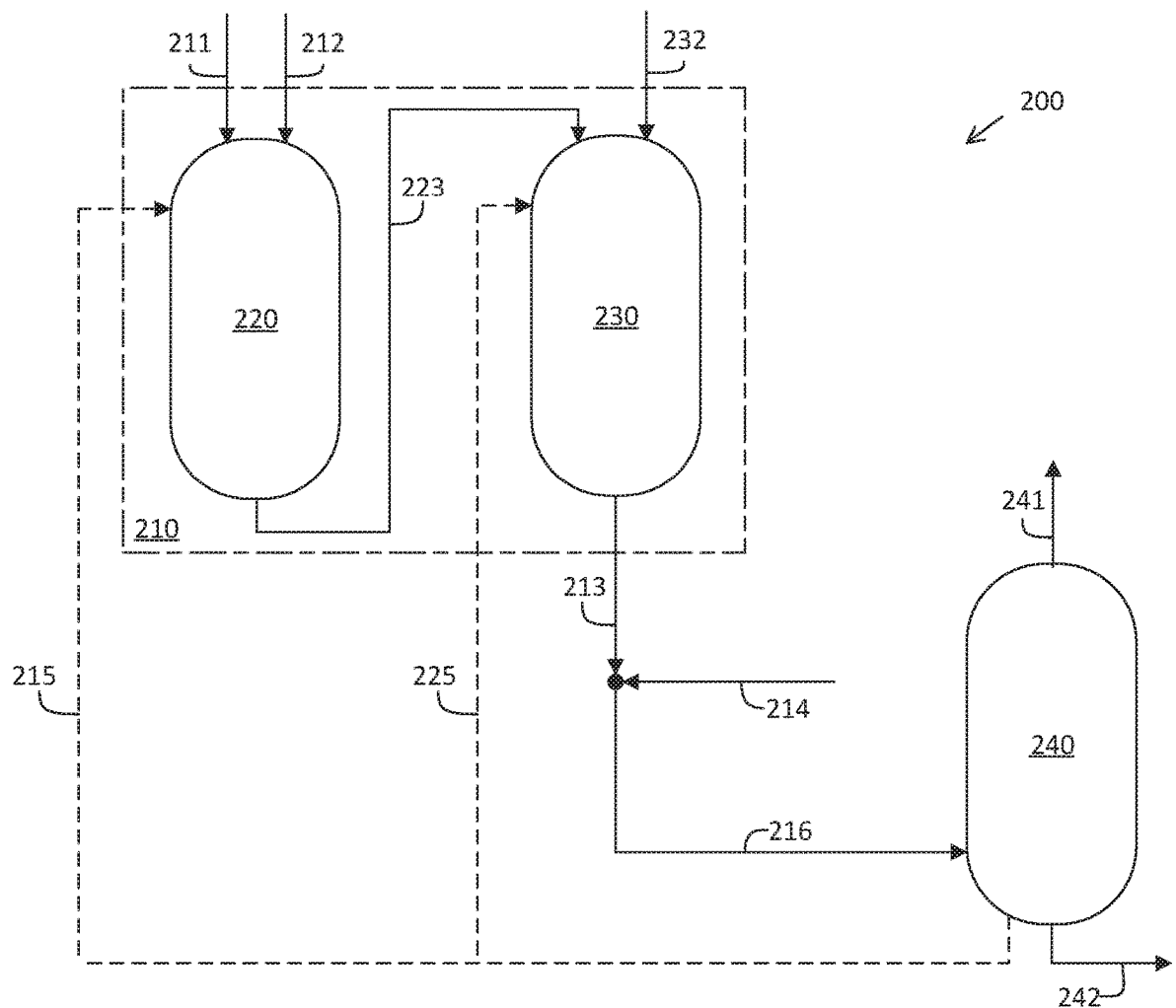
FIG. 2 is a schematic diagram of a series-flow or once-through hydrocracking process unit.

FIG. 2 schematically illustrates a series-flow or once-through hydrocracking process unit 200 for suppressing the precipitation of HPNAs. In a once-through configuration, all of the effluent from the first stage is sent directly to the second stage. In a once-through configuration with recycle, all of the effluent from the first stage is sent directly to the second stage and a portion of the unconverted bottoms is recycled to the first stage. The once-through hydrocracking process unit 200 has a fractionator 240 and a hydrocracking unit 210 with first- and second-stage reaction zones 220, 230 respectively. A hydrocracker feedstock stream 211 comprising a hydrocarbon feedstock and a hydrogen stream 212 comprising hydrogen are in fluid communication with the first-stage reaction zone 220. The hydrocracker feedstock stream 211 can be combined with the hydrogen stream 212 before being introduced to the first-stage reaction zone 220, or they can be introduced independently. The hydrogen stream 212 can be configured to provide sufficient excess hydrogen to the first-stage reaction zone 220 so that sufficient hydrogen is provided for carrying out hydrocracking in both the first- and second-stage reaction zones. Alternatively, a second hydrogen stream 232 can independently provide additional hydrogen to the second-stage reaction zone 230.

The first-stage reaction zone 220 is in fluid communication with the second-stage reaction zone 230 by a first-stage effluent stream 223 comprising first-stage effluent. Alternatively, the first-stage reaction zone 220 and the second-stage reaction zone 230 can be in fluid communication directly without any intermediate stream (e.g., stacked-bed dual-catalyst system). In configurations having a second hydrogen stream 232, the first-stage effluent stream 223 can be combined with the second hydrogen stream 232 before being introduced to the second-stage reaction zone 230. The second-stage reaction zone 230 is in fluid communication with the fractionator 240 by a hydrocracking-unit effluent stream 213 and a HPNA-suppressed effluent stream 216 in series; the hydrocracking-unit effluent stream 213 comprising hydrocracking-unit effluent and the HPNA-suppressed effluent stream 216 comprising HPNA-suppressed effluent. An aromatic solvent stream 214 comprising an aromatic solvent is introduced to the hydrocracking-unit effluent between the second-stage reaction zone 230 and the fractionator 240. Because HPNA compounds tend to deposit when they are cooled, it is preferable to introduce the aromatic solvent before the second-stage effluent is cooled. In some embodiments, the aromatic solvent is introduced to the hydrocracking-unit effluent stream 213 before any feed-effluent heat exchangers. In some embodiments, the aromatic solvent is introduced to the hydrocracking-unit effluent stream 213 before a trim cooler. In some embodiments, the aromatic solvent is introduced to the hydrocracking-unit effluent stream 213 before it is cooled in an air cooler. In some embodiments, the aromatic solvent is introduced to the hydrocracking-unit effluent stream 213 before a high-pressure-high-temperature separator. A HPNA-suppressed effluent is produced from the combination of the hydrocracking-unit effluent in the hydrocracking-unit effluent stream 213 with the aromatic solvent from aromatic solvent stream 214. The hydrocracking-unit effluent in hydrocracking-unit effluent stream 213 combines with the aromatic solvent stream 214 to create the HPNA-suppressed effluent stream 216 comprising HPNA-suppressed effluent. Heavy polynuclear aromatic precipitation is suppressed in downstream processes by the aromatic solvent in the HPNA-suppressed effluent stream 216.

The HPNA-suppressed effluent from HPNA-suppressed effluent stream 216 is separated in fractionator 240 into unconverted bottoms and overhead products, and the unconverted bottoms and overhead products are removed from the fractionator and the process unit as an unconverted bottoms stream 242 and as overhead product streams 241. Optionally, the fractionator 240 is in fluid communication with the hydrocracking unit 210 by a first- or second-stage recycle stream 215, 225, or both, to recycle at least a portion of the unconverted bottoms. In configurations having a first-stage recycle stream 215, the fractionator 240 is in fluid communication with the first-stage reaction zone 220 by the first-stage recycle stream 215; and the first-stage recycle stream 215 can be drawn from the fractionator 240 or the unconverted bottoms stream 242. Similarly, in configurations having a second-stage recycle stream 225, the fractionator is in fluid communication with the second-stage reaction zone 230 by the second-stage recycle stream 225; and the second-stage recycle stream 225 can be drawn from the fractionator 240 or the unconverted bottoms stream 242.

In certain embodiments, a process for suppressing HPNA precipitation in a process unit like the process unit of FIG. 2 comprises the steps of: supplying a hydrocracking feedstock and hydrogen; reacting the hydrocracking feedstock with hydrogen in the first-stage zone of the hydrocracking unit to produce a first-stage effluent; optionally supplying hydrogen to the second-stage reaction zone of the hydrocracking unit; reacting the first-stage effluent and hydrogen in a second-stage reaction zone to produce a hydrocracked effluent; supplying an aromatic solvent and introducing it to the hydrocracked effluent to suppress HPNA precipitation and produce a HPNA-suppressed effluent; separating the HPNA-suppressed effluent into unconverted bottoms and overhead products; and optionally recycling at least a portion of the unconverted bottoms to the hydrocracking unit (i.e., the first- or second-stage reaction zones, or both) to react with the hydrocracking feedstock and hydrogen. This process is a dual-catalyst system, and can be used in a stacked-bed configuration or in multiple-reactor configurations.

The step of supplying a hydrocracking feedstock and hydrogen includes providing a hydrocarbon feedstock such as vacuum gas oils boiling in the range of about 370-565° C. for conventional hydrocracking reactors, or hydrocarbons boiling above about 565° C. for residue hydrocracking units. Demetalized oil or deasphalted oil can be blended with vacuum gas oil for hydrocracking or used alone. By way of example and not limitation, a hydrocarbon feedstock can be a blend composed of about 75-90% vacuum gas oils and 10-25% demetalized oil or deasphalted oil. For difficult operations, the hydrocarbon feedstock can be 100% demetalized oil or deasphalted oil. However, heavy feedstocks such as demetalized oil or deasphalted oil have much higher concentrations of nitrogen, sulfur, and poly nuclear aromatic compounds (i.e. compounds having less than seven fused aromatic rings) than vacuum gas oil feedstock. These impurities can lower the efficiency of the hydrocracking unit and require the hydrocracking process to be carried out with a higher operating temperature, higher partial pressure of hydrogen, or additional catalyst volume. High concentrations of impurities can also accelerate catalyst deactivation. The feedstock and hydrogen can be combined before being introduced to a hydrocracking unit, or they can be introduced independently.

The step of reacting the hydrocracking feedstock with hydrogen in the first-stage zone of the hydrocracking unit to produce a first-stage effluent includes reacting the feedstock and hydrogen in the first-stage reaction zone to produce a first-stage effluent. Sufficient excess hydrogen can be provided to carry out hydrocracking in both the first- and second-stage reaction zones. The feedstock can be mixed with hydrogen prior to being introduced to the first-stage reaction zone, or the feedstock and hydrogen can be introduced to the first-stage reaction zone independently. The hydrocracking feedstock is hydrotreated or hydrotreated and hydrocracked in this first stage. The first-stage reaction zone is operated at a temperature in the range of about 300° C. to about 500° C.; a pressure in the range of about 50 bar to about 200 bar; a hydrogen feed rate up to about 2500 standard liters per liter of hydrocarbon feed; and a liquid hourly space velocity in the range of about 0.25 to about 3.0 per hour.

The step of optionally supplying additional hydrogen to a second-stage reaction zone of the hydrocracking unit can minimize or obviate the need to provide excess hydrogen to the first-stage reaction zone. The second hydrogen stream can be combined with the first-stage effluent prior to being introduced to the second-stage reaction zone, or it can be introduced to the second-stage reaction zone independently.

In the step of hydrocracking the first-stage effluent and hydrogen in the second-stage reaction zone of the hydrocracking unit to produce a hydrocracked effluent, the second-stage reaction zone can be operated at a lower temperature (i.e., a reduction in temperature of about 30-50° C.). Since the first-stage reaction zone accomplishes both hydrotreating and hydrocracking, the first-stage effluent is virtually free of ammonia and hydrogen sulfide. This permits the use of high performance zeolite catalysts, which are susceptible to poisoning by sulfur or nitrogen compounds.

In the step of supplying an aromatic solvent and introducing it to the hydrocracked effluent to suppress HPNA precipitation and produce a HPNA-suppressed effluent, the aromatic solvent can be an aromatic-rich hydrocarbon solution at least partially composed of heavy alkyl aromatic compounds and multi-ring aromatic compounds. The aromatic solvent has a HSB parameter of at least about 18 $MPa^{1/2}$. In some embodiments, the aromatic solvent has a HSB parameter of at least about 20 $MPa^{1/2}$. In some embodiments, the aromatic solvent has a HSB parameter in the range of about 20-22 $MPa^{1/2}$. In some embodiments, the aromatic solvent is straight-run aromatic bottoms from an aromatic recovery complex. In some embodiments, the aromatic solvent is full-range straight-run aromatic bottoms from an aromatic recovery complex. In some embodiments, the aromatic solvent is a fraction of aromatic bottoms from an aromatic recovery complex boiling above 180° C. In some embodiments, the aromatic solvent is the $C_{11+}$ fraction of the aromatic bottoms from an aromatic recovery complex. An example of an aromatic solvent is the full-range aromatic bottoms or heavy aromatic bottoms fraction (e.g., the fraction boiling above 180° C.) disclosed in Table 1, and the aromatic solvents discussed in Examples 1-3 below. The addition of the aromatic solvent suppresses HPNA precipitation in downstream processes; improving process efficiency, minimizing or eliminating the need to treat the stream for the removal of HPNAs, and increasing overall distillate yield.

The step of separating the HPNA-suppressed effluent into unconverted bottoms and overhead products includes removing the unconverted bottoms and overhead products from the fractionator as unconverted bottoms and overhead products. Separation of the HPNA-suppressed effluent can be achieved by fractionation in a fractionator. Dissolved HPNAs are removed from the fractionator with the unconverted bottoms.

In the step of optionally recycling at least a portion of the unconverted bottoms to the hydrocracking unit to react with the hydrocracking feedstock and hydrogen, includes optionally recycling at least a portion of the unconverted bottoms to the first- or second-stage reaction zone, or both, to hydrocrack the unconverted bottoms with the feedstock and hydrogen. Regarding the first-stage reaction zone recycle, the unconverted bottoms in the recycle stream can be combined with the feedstock, hydrogen, or both before being introduced to the first-stage reaction zone; or they can be introduced independently. As for the second-stage reaction zone recycle, the recycle stream can be combined with the first-stage effluent stream, second hydrogen stream, or both before being introduced to the second-stage reaction zone; or it can be introduced independently.

An example of a series-flow two-stage hydrocracking process for suppressing HPNA precipitation in a process unit like the process unit of FIG. 2 is provided here. A key characteristic of this process is that the effluent from the first reaction zone is not separated before being hydrocracked in a second reaction zone. In this configuration, the hydrocracking unit has first- and second-stage reaction zones. The hydrocracking feedstock is hydrotreated in the first-stage reaction zone to produce a first-stage reaction-zone effluent.

The first-stage reaction zone can be operated at a temperature in the range of about 300° C. to about 500° C.; a pressure in the range of about 50 bar to about 200 bar; a hydrogen feed rate up to about 2500 standard liters per liter of hydrocarbon feed; and a liquid hourly space velocity in the range of about 0.25 to about 3.0 per hour. The first-stage reaction-zone effluent is hydrocracked in the second-stage reaction zone to produce a hydrocracking unit effluent.

The second-stage reaction zone can be operated at a temperature in the range of about 300° C. to about 500° C.; a pressure in the range of about 50 bar to about 200 bar; a hydrogen feed rate up to about 2500 standard liters per liter of hydrocarbon feed; and a liquid hourly space velocity in the range of about 0.25 to about 3.0 per hour. Because contaminants such as ammonia and hydrogen sulfide are eliminated from the first-stage reaction-zone effluent, the relevant kinetic rate constants in the clean environment are much higher allowing the second-stage reaction zone to be operated at a reduced temperature (i.e., a reduction in temperature of about 30-50° C.). In some embodiments, the operating temperature in the second-stage reaction zone can be in the range of about 300-450° C. The reduced operating temperature of the second-stage reaction zone can favor aromatic saturation and improved selectivity for diesel and higher quality products.

An aromatic solvent is introduced to the hydrocracking unit effluent to produce a HPNA-suppressed effluent. The aromatic solvent suppresses HPNA precipitation in downstream processes, improving process efficiency, minimizing or eliminating the need to treat the stream for the removal of HPNAs, and increasing overall distillate yield. The HPNA-suppressed effluent is separated in a fractionator to produce overhead products including naphtha, jet fuel, or diesel and unconverted bottoms. Unconverted bottoms can be recycled to the first- or second-stage reaction zones by first- or second-stage recycle streams respectively; or the unconverted bottoms can be recycled to both the first- and second-stage reaction zones by the first- and second-stage recycle streams respectively. Sufficient excess hydrogen can be added to the first-stage reaction zone so that the first-stage effluent can be reacted in the second-stage reaction zone without additional hydrogen. Alternatively, additional hydrogen can be independently supplied to the second-stage reaction zone by a second hydrogen stream.

Figure 3:
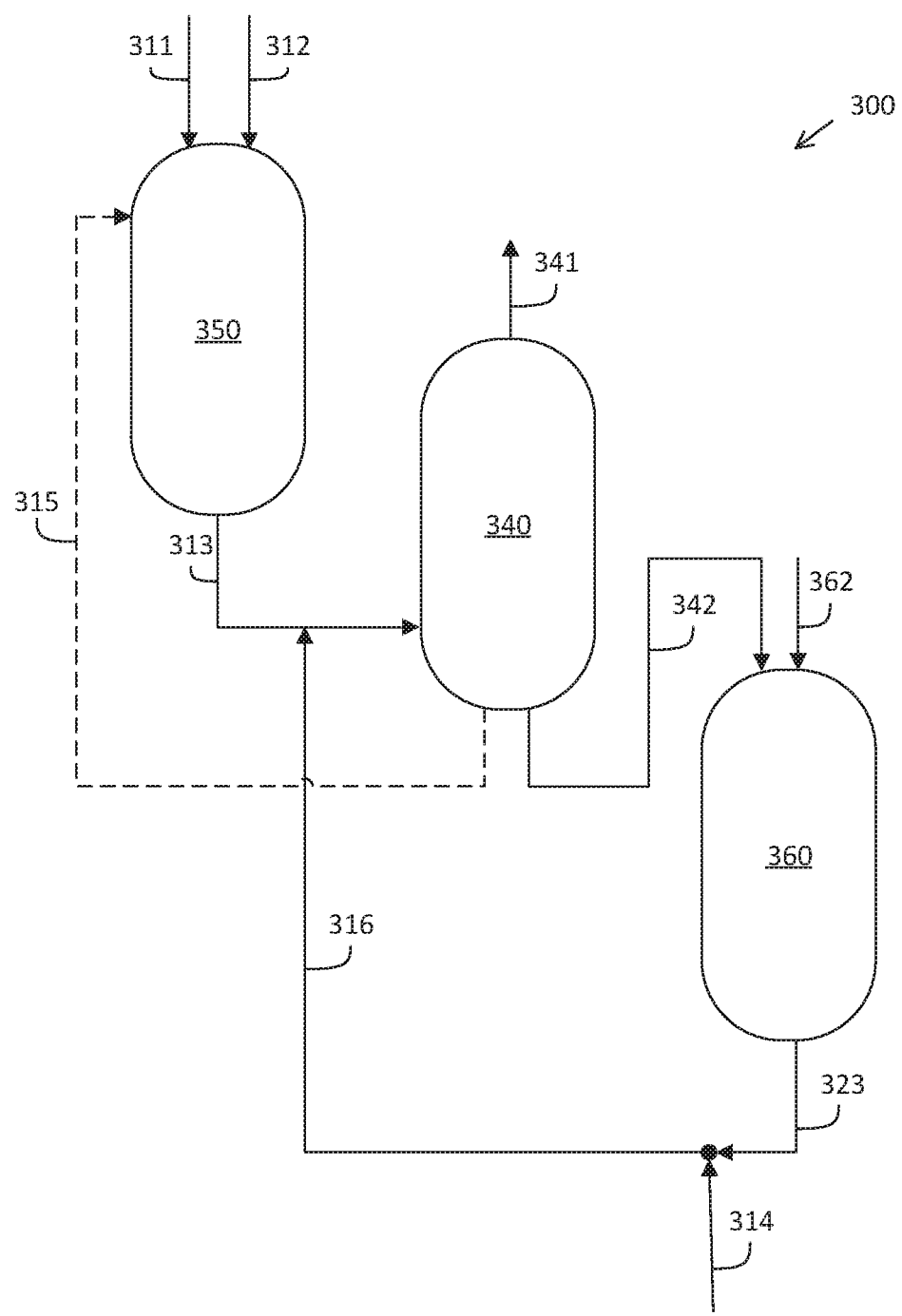
FIG. 3 is a schematic diagram of a two-stage hydrocracking process unit.

FIG. 3 schematically illustrates a two-stage hydrocracking process unit 300 for suppressing the precipitation of HPNAs. The two-stage hydrocracking process unit 300 has first- and second-stage hydrocracking units 350 and 360 respectively, and a fractionator 340. A hydrocracker feedstock stream 311 comprising a hydrocarbon feedstock and a hydrogen stream 312 comprising hydrogen are in fluid communication with the first-stage hydrocracking unit 350. The hydrogen stream 312 and the hydrocracker feedstock stream 311 can be combined before being introduced to the first-stage hydrocracking unit 350. A second hydrogen stream 362 comprising hydrogen can independently provide additional hydrogen to the second-stage hydrocracking unit 360.

The first-stage hydrocracking unit 350 is in fluid communication with the fractionator 340 by a first-stage effluent stream 313 comprising first-stage effluent. The fractionator 340 receives the first-stage effluent from first-stage effluent stream 313 and separates the first-stage effluent into unconverted bottoms and overhead products. The unconverted bottoms and overhead products are removed from the fractionator 340 in unconverted bottoms stream 342 and overhead product streams 341 respectively. The fractionator 340 is in fluid communication with the second-stage hydrocracking unit 360 by the unconverted bottoms stream 342. In configurations having a second hydrogen stream 362, the second hydrogen stream 362 can be combined with the unconverted bottoms stream 342 before being introduced to the second-stage hydrocracking unit 360, or the second hydrogen stream 362 can be introduced directly to the second-stage hydrocracking unit 360.

The second-stage hydrocracking unit 360 is in fluid communication with the fractionator 340 by a second-stage effluent stream 323 and a HPNA-suppressed effluent stream 316, the two streams in series; the second-stage effluent stream 323 comprising second-stage effluent, and the HPNA-suppressed effluent stream 316 comprising HPNA-suppressed effluent. An aromatic solvent stream 314 comprising an aromatic solvent is introduced to the second-stage effluent stream 323 between the second-stage hydrocracking unit 360 and the fractionator 340 to produce the HPNA-suppressed effluent stream 316. Because HPNA compounds tend to deposit when they are cooled, it is preferable to introduce the aromatic solvent before the second-stage effluent is cooled. In some embodiments, the aromatic solvent is introduced to the second-stage effluent stream 323 before any feed-effluent heat exchangers. In some embodiments, the aromatic solvent is introduced to the second-stage effluent stream 323 before a trim cooler. In some embodiments, the aromatic solvent is introduced to the second-stage effluent stream 323 before it is cooled in an air cooler. In some embodiments, the aromatic solvent is introduced to the second-stage effluent stream 323 before a high-pressure-high-temperature separator. A HPNA-suppressed effluent is produced from the combination of the second-stage effluent in second-stage effluent stream 323 with the aromatic solvent from aromatic solvent stream 314. At least a portion of the unconverted bottoms can be removed from the fractionator 340 by a bleed stream 334. The bleed stream 334 can be drawn from the unconverted bottoms stream 342 or directly from the fractionator 340.

The unconverted bottoms can be recycled to the first-stage hydrocracking unit 350 by a recycle stream 315 such that the fractionator 340 is in fluid communication with the first-stage hydrocracking unit 350 by the recycle stream 315. In configurations having a recycle stream 315, the recycle stream 315 can be drawn from the fractionator 340 or the unconverted bottoms stream 342, and the recycle stream 315 can be introduced to the first-stage hydrocracking unit 350 directly or combined with the hydrocracker feedstock stream 311 or the hydrogen stream 312, or both, before being introduced to the first-stage hydrocracking unit 350.

In certain embodiments, a process for suppressing HPNA precipitation in a process unit like the process unit of FIG. 3 comprises the steps of: supplying a feedstock and hydrogen to a first-stage hydrocracking unit; reacting the feedstock and hydrogen in the first-stage hydrocracking unit to produce a first-stage effluent; separating the first-stage effluent into unconverted bottoms and overhead products in a fractionator; optionally recycling a portion of the unconverted bottoms to the first-stage hydrocracking unit to react with the hydrogen and feedstock; optionally supplying additional hydrogen to a second-stage hydrocracking unit; reacting the unconverted bottoms with hydrogen in the second-stage hydrocracking unit to produce a second-stage effluent; supplying and combining an aromatic solvent with the second-stage effluent to suppress HPNA precipitation and produce a HPNA-suppressed effluent; and separating the HPNA-suppressed effluent in the fractionator.

The step of supplying a feedstock and hydrogen to a first-stage hydrocracking unit includes providing a hydrocarbon feedstock such as vacuum gas oils boiling in the range of about 370-565° C. for conventional hydrocracking reactors, or hydrocarbons boiling above about 565° C. for residue hydrocracking units. Demetalized oil or deasphalted oil can be blended with vacuum gas oil for hydrocracking or used alone. By way of example and not limitation, a hydrocarbon feedstock can be a blend composed of about 75-90% vacuum gas oils and 10-25% demetalized oil or deasphalted oil. For difficult operations, the hydrocarbon feedstock can be 100% demetalized oil or deasphalted oil. However, heavy feedstocks such as demetalized oil or deasphalted oil have much higher concentrations of nitrogen, sulfur, and polynuclear aromatic compounds (i.e., compounds having less than seven fused aromatic rings) than vacuum gas oil feedstock. These impurities can lower the efficiency of the hydrocracking unit and require the hydrocracking process to be carried out with a higher operating temperature, higher partial pressure of hydrogen, or additional catalyst volume. High concentrations of impurities can also accelerate catalyst deactivation. The feedstock and hydrogen can be combined before being introduced to a hydrocracking unit, or they can be introduced independently.

The step of reacting the feedstock and hydrogen in the first-stage includes introducing the feedstock and hydrogen to a hydrocracking unit having first- and second-stage reaction zones and reacting the feedstock and hydrogen in the first-stage reaction zone to produce a first-stage effluent. Sufficient excess hydrogen can be provided to carry out hydrocracking in both the first- and second-stage reaction zones. The feedstock can be mixed with hydrogen prior to being introduced to the first-stage reaction zone, or the feedstock and hydrogen can be introduced to the first-stage reaction zone independently. The hydrocracking feedstock is hydrotreated or hydrotreated and hydrocracked in this first stage. The first-stage reaction zone is operated at a temperature in the range of about 300° C. to about 500° C.; a pressure in the range of about 50 bar to about 200 bar; a hydrogen feed rate up to about 2500 standard liters per liter of hydrocarbon feed; and a liquid hourly space velocity in the range of about 0.25 to about 3.0 per hour.

In the step of separating the first-stage effluent into unconverted bottoms and overhead products, separation is usually achieved by fractionation in a fractionator. The unconverted bottoms and overhead products are removed from the fractionator by an unconverted bottoms stream and overhead products streams. Dissolved HPNAs are removed from the fractionator with the unconverted bottoms stream.

In the step of optionally recycling a portion of the unconverted bottoms to the first-stage hydrocracking unit to be hydrocracked along with the feedstock, a portion of the unconverted bottoms is recycled to the first-stage hydrocracking unit by a recycle stream. The recycle stream can be combined with the feedstock, hydrogen, or both before being introduced to the first-stage hydrocracking unit; or it may be introduced independently.

In the step of optionally supplying additional hydrogen to a second-stage hydrocracking unit to produce a second-stage effluent, the additional hydrogen is supplied to the second-stage hydrocracking unit by a second hydrogen stream. The second hydrogen stream minimizes or obviates the need to provide excess hydrogen to the first-stage hydrocracking unit. The second hydrogen stream can be combined with the unconverted bottoms stream prior to being introduced to the second-stage reaction zone, or it can be introduced to the second-stage reaction zone independently.

The step of reacting the unconverted bottoms with hydrogen in the second-stage hydrocracking unit to produce a second-stage effluent includes hydrocracking the unconverted bottoms and hydrogen in the second-stage reaction zone of the hydrocracking unit to produce a second-stage effluent. Because the first-stage effluent is substantially free of impurities, the second-stage reaction zone can be operated at a lower temperature (i.e., a reduction in temperature of about 30-50° C.). Since the first-stage reaction zone accomplishes both hydrotreating and hydrocracking, the first-stage effluent is virtually free of ammonia and hydrogen sulfide. This permits the use of high performance zeolite catalysts, which are susceptible to poisoning by sulfur or nitrogen compounds.

In the step of supplying and combining an aromatic solvent with the second-stage effluent to suppress HPNA precipitation and produce a HPNA-suppressed effluent, the aromatic solvent can be an aromatic-rich hydrocarbon solution at least partially composed of heavy alkyl aromatic compounds and multi-ring aromatic compounds. Preferably, the aromatic solvent has a HSB parameter in the range of about 18-22 MPa$^{1/2}$. More preferably, the aromatic solvent has a HSB parameter in the range of about 20-22 MPa$^{1/2}$. In some embodiments, the aromatic solvent is straight-run aromatic bottoms from an aromatic recovery complex. In some embodiments, the aromatic solvent is full-range straight-run aromatic bottoms from an aromatic recovery complex. In some embodiments, the aromatic solvent is a fraction of aromatic bottoms from an aromatic recovery complex boiling above 180° C. In some embodiments, the aromatic solvent is the $C_{11+}$ fraction of the aromatic bottoms from an aromatic recovery complex. An example of an aromatic solvent is the full-range aromatic bottoms or heavy aromatic bottoms fraction (e.g., the fraction boiling above 180° C.) disclosed in Table 1, and the aromatic solvents discussed in Examples 1-3 below. The addition of the aromatic solvent suppresses HPNA precipitation in downstream processes; improving process efficiency, minimizing or eliminating the need to treat the stream for the removal of HPNAs, and increasing overall distillate yield.

The step of separating the HPNA-suppressed effluent in the fractionator includes separating the HPNA-suppressed effluent into unconverted bottoms and overhead products and removing the unconverted bottoms and overhead products as an unconverted bottoms and overhead products respectively. Separation of the HPNA-suppressed effluent is usually achieved by fractionation in a fractionator. To avoid the accumulation of suppressed HPNA compounds in the system, suppressed HPNA compounds should be bled from the system. In some embodiments, suppressed HPNA compounds are removed from the system with unconverted bottoms.

An example of the two-stage hydrocracking process in a process unit like the process unit of FIG. 3 is provided here. This two-stage process provides the advantages of increased conversion or capacity, improved product quality, and the ability to process difficult feedstocks (e.g., feedstocks having high nitrogen or high aromatic content). In this configuration, the process unit has first- and second-stage hydrocracking units and a fractionator.

A hydrocracker feedstock, such as a blend containing vacuum gas oil boiling in the nominal range of from about 370-565° C., and demetalized oil or deasphalted oil in the range of from about 10-25 vol %, is combined with hydrogen from a hydrogen feedstock stream and hydrotreated or hydrotreated and hydrocracked in a first-stage hydrocracking unit to produce a first-stage effluent. The first-stage hydrocracking unit is operated at a temperature in the range of from about 300-500° C.; a reaction pressure in the range of from about 50-200 bar; a hydrogen feed rate of up to about 2500 standard liters per liter of hydrocarbon feed; and a liquid hourly space velocity in the range of from about 0.25-3.0 per hour.

The first-stage effluent is fractionated in a fractionator to produce unconverted bottoms and overhead products. The overhead products are removed from the fractionator in overhead product streams. The unconverted bottoms are removed from the fractionator in an unconverted bottoms stream, and optionally recycled to the first-stage hydrocracking unit by a recycle stream. The recycle stream can be combined with the hydrocracker feedstock stream or the hydrogen stream, or both, prior to being introduced to the first-stage hydrocracking unit.

The unconverted bottoms are hydrocracked in a second-stage hydrocracking unit to produce a second-stage effluent. The second-stage hydrocracking unit is operated at a temperature in the range of from about 300-500° C.; a reaction pressure in the range of from about 50-200 bar; a hydrogen feed rate of up to about 2500 standard liters per liter of hydrocarbon feed; and a liquid hourly space velocity in the range of from about 0.25-3.0 per hour. Because contaminants such as ammonia and hydrogen sulfide are eliminated from the unconverted bottoms, the relevant kinetic rate constants in the clean environment are much higher allowing the second-stage hydrocracking unit to be operated at a reduced temperature (i.e., a reduction in temperature of about 30-50° C.); the actual temperature reduction is dependent on the zeolite content of the catalyst. In some embodiments, the operating temperature in the second-stage reaction zone can be in the range of about 300-450° C. The reduced operating temperature of the second-stage hydrocracking unit can favor aromatic saturation and improved selectivity for diesel and higher quality products. Additional hydrogen can be independently provided to the second-stage hydrocracking unit.

An aromatic solvent is introduced to the second-stage effluent to produce a HPNA-suppressed effluent. The aromatic solvent suppresses HPNA precipitation in downstream processes; improving process efficiency, minimizing or eliminating the need to treat the stream for the removal of HPNAs, and increasing overall distillate yield. The HPNA-suppressed effluent is fractionated in the fractionator. The HPNA-suppressed effluent can be combined with the first-stage effluent before being introduced to the fractionator.

EXAMPLES

Example 1

A hydrocracker unit with two reactors in a once-through configuration with recycle was configured to process 30,000 barrels per stream day (BPSD) of feedstock, which is a blend of 15% demetalized oil and 85% vacuum gas oil. The first stage was operated at 404° C. with a partial pressure for hydrogen of 115 bar. Conversion under these conditions was 50 vol % in the first stage. The second stage was operated at 375° C. and resulted in conversion of 25 vol %, and overall conversion of 95 vol % with recycle. The unit typically yields 41.2 vol % whole naphtha with a research octane number of 60 and 49.1 vol % mid-distillate with a cetane index (as determined using ASTM D976) of 56. An aromatic solvent comprising about 2000 BPSD of the full-range aromatic bottoms from an aromatic recovery complex was mixed with the effluents from the second-stage reactor to dissipate the HPNAs formed during the process. The aromatic solvent had a HSB parameter of 20.7 MPa$^{1/2}$. Addition of the aromatic solvent increased the whole naphtha yield by 1,140 BPSD, and mid-distillate yield by 860 BPSD. The addition of an aromatic solvent increased the distillate yield without negatively affecting key properties.

Example 2

A 7.2 g sample containing 1,000 ppm of HPNA from the recycle stream of a hydrocracking unit was mixed with 12.7 g of an aromatic solvent derived from the aromatic bottoms stream of an aromatic recovery complex. Before mixing, precipitated HPNAs were observed visually in the recycle stream as particulates in the stream and as deposits on the walls of the vial containing the sample. The precipitated HPNAs and deposits were dissolved and no longer visible after mixing the aromatic solvent sample with the recycle stream sample.

Example 3

A 9.5 g sample from the recycle stream of a hydrocracking unit was mixed with 17.7 g of an n-pentane solvent to precipitate HPNAs. The HPNA precipitate was visible. An 85.0 g aromatic solvent sample from the aromatic bottoms stream of an aromatic recovery complex was added to the suspension. The addition of the aromatic solvent dissolved the HPNA precipitate, and prevented further precipitation of HPNAs.

We claim:

1. A method for suppressing precipitation of heavy polynuclear aromatic hydrocarbons (HPNA) in a refinery, the method comprising the steps of:
   supplying a hydrocarbon feedstock and hydrogen to a hydrocracking unit having a first stage reaction zone;
   hydrocracking the hydrocarbon feedstock in the hydrocracking unit to produce a hydrocracked effluent;
   introducing an aromatic solvent derived from aromatic bottoms from an aromatic recovery complex to the hydrocracked effluent such that precipitation of HPNA compounds is suppressed and a HPNA-suppressed effluent is produced; and
   fractionating the HPNA-suppressed effluent to produce overhead products and unconverted bottoms.

2. The method of claim 1, wherein the aromatic solvent comprises a fraction of aromatic bottoms, the fraction of aromatic bottoms boiling above 180° C.

3. The method of claim 1, wherein the aromatic solvent comprises heavy alkyl aromatic compounds and multi-ring aromatic compounds.

4. The method of claim 1, wherein the aromatic solvent has a Hildebrand solubility parameter of at least 18 $MPa^{1/2}$.

5. The method of claim 1, wherein the step of hydrocracking the hydrocarbon feedstock to produce a hydrocracked effluent includes first hydrotreating the hydrocarbon feedstock to produce a first-stage effluent, and second hydrocracking the first-stage effluent to produce the hydrocracked effluent.

6. A method for suppressing precipitation of HPNAs in a refinery, the method comprising the steps of:
   supplying a hydrocarbon feedstock and hydrogen;
   hydrocracking the hydrocarbon feedstock to produce a first-stage effluent;
   fractionating the first-stage effluent to produce overhead products and one or more unconverted bottoms;
   hydrocracking the one or more unconverted bottoms to produce a second-stage effluent;
   combining the second-stage effluent with an aromatic solvent derived from an aromatic bottoms to suppress precipitation of HPNA compounds and produce a HPNA-suppressed effluent;
   fractionating the HPNA-suppressed effluent.

7. The method of claim 6, further comprising the step of hydrocracking at least a portion of the unconverted bottoms with the hydrocarbon feedstock to produce the first-stage effluent.

8. The method of claim 6, wherein the aromatic solvent comprises a fraction of aromatic bottoms, the fraction of aromatic bottoms having an initial boiling point above 180° C.

9. The method of claim 6, wherein the aromatic solvent comprises heavy alkyl aromatic compounds and multi-ring aromatic compounds.

10. The method of claim 6, wherein the aromatic solvent has a Hildebrand solubility parameter of at least 18 $MPa^{1/2}$.

* * * * *